United States Patent

[11] 3,624,152

[72] Inventor  Yung Ki Kim
               Midland, Mich.
[21] Appl. No. 9,436
[22] Filed     Feb. 6, 1970
[45] Patented  Nov. 30, 1971
[73] Assignee  Dow Corning Corporation
               Midland, Mich.
               Continuation-in-part of application Ser. No.
               739,155, June 24, 1968, now abandoned.
               This application Feb. 6, 1970, Ser. No.
               9,436

[54] PERFLUORO-$\beta$-THIAGLUTARIC AMIDE
     1 Claim, No Drawings
[52] U.S. Cl. .................................................. 260/561 S,
                    260/481 R, 260/537 S, 252/47.5, 252/49.6

[51] Int. Cl. ........................................................ C07c 103/00
[50] Field of Search ............................................ 260/561 S

[56]                    References Cited
                   UNITED STATES PATENTS
2,981,717   4/1961   Boultbee ..................... 260/561 S X
3,522,293   7/1970   Harris ........................... 260/561 S X Primary Examiner—Lewis Gotts
Assistant Examiner—Ethel G. Love
Attorneys—Robert F. Fleming, Jr., Laurence R. Hobey, Harry
    D. Dingman and Norman E. Lewis ABSTRACT: $H_2NOCCF_2SCF_2CONH_2$ is disclosed as being useful as lubricants additives.

PERFLUORO-β-THIAGLUTARIC AMIDE

This application is a continuation-in-part of copending application Ser. No. 739,155, filed June 24, 1968, now abandoned.

This invention relates to perfluoro-β-thiaglutaric amides of the formula $H_2NOCCF_2SCF_2CONH_2$.

Perfluoro-β-thiaglutaric acid ($HOOCCF_2SCF_2COOH$) is prepared by oxidation of 2,2,5,5-tetrafluoro-3,4-dichlorothiolene-3 with conventional oxidizing agents such as potassium permanganate. The reaction is as follows:

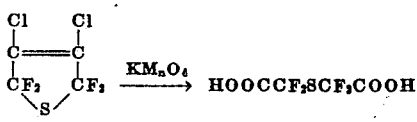

This reaction proceeds well at from 25° to 50° C. and atmospheric pressure. The thiolene precursor is obtained by reacting tetrachlorothiophene with silver difluoride.

The perfluoro-β-thiaglutaric acid is reacted with an alcohol such as methanol or ethanol, to yield the corresponding diester, $ROOCCF_2SCF_2COOR$. This diester is then reacted with ammonia under conventional conditions to produce the amide of the invention, $H_2NOCCF_2SCF_2CONH_2$.

The diamide compounds of the invention are useful as additives to improve the lubrication properties of silicone fluids, such as 3,3,3-trifluoropropylmethylpolysiloxane. The perfluoro-β-thiaglutaramide can be added in amounts in the range of 1 to 5 percent by weight, based on the weight of fluid.

EXAMPLE 1

Tetrachlorothiophene (45 grams) was added to silver difluoride (200 grams) at 0° C., the reaction was vigorous; after its completion, the volatile materials were stripped at room temperature. The reaction product, 2,2,5,5-tetrafuoro-3,4-dichlorothiolene-3, had a boiling point of 115° to 117° C.

The fluorinated thiolene (16 grams) was dissolved in 70 ml. of acetone. To this solution, 24 grams of potassium permanganate were added while maintaining the reaction at 25° to 50° C. by external cooling. After stirring for 2 hours at a temperature below 50° C., about 150 ml. of water was added to the reaction mixture. The solids were filtered out and the filtrate was extracted with ether for about 40 hours. Evaporation of the ethereal extract gave the perfluoro-β-thiaglutaric acid of the invention.

The acid product was converted to the corresponding diethylester by treatment with 40 ml. of ethanol and 4 ml. of concentrated sulfuric acid.

The isolated diethylperfluoro-β-thiaglutarate was taken into methylene chloride and treated with anhydrous ammonia to give rise to $H_2NOCCF_2SCF_2CONH_2$ which had a melting point of 154° to 156° C. the sulfur content was found to be 14.40 percent (cal. 14.53 percent). The $^{19}F$, n.m.r., infrared, and mass spectral data were consistent with the structure of perfluoro-β-thiaglutaramide.

That which is claimed is:

1. A compound of the formula $H_2NOCCF_2SCF_2CONH_2$.

* * * * *